United States Patent [19]
Boggs et al.

[11] 3,831,257
[45] Aug. 27, 1974

[54] METHOD AND APPARATUS FOR ASSEMBLING WELDED TRACK HINGE JOINTS

[75] Inventors: Roger L. Boggs; Duane L. Burk, both of East Peoria, Ill.

[73] Assignee: Caterpillar Tractor Co., Peoria, Ill.

[22] Filed: Apr. 11, 1973

[21] Appl. No.: 349,922

[52] U.S. Cl............................. 29/401, 59/7, 59/31, 219/51, 219/52, 228/6, 228/29, 228/32
[51] Int. Cl............................. B23p 7/00, B211 9/06
[58] Field of Search.............. 29/401, 426; 59/7, 11, 59/31; 219/51, 52; 228/6, 29, 32, 45

[56] References Cited
UNITED STATES PATENTS

| | | | |
|---|---|---|---|
| 2,387,551 | 10/1945 | Abramson et al. | 59/7 |
| 3,099,130 | 7/1963 | Pahl | 59/7 |
| 3,472,022 | 10/1969 | Leffingwell et al. | 59/7 |
| 3,508,025 | 4/1970 | Glendenning | 219/51 |
| 3,553,960 | 1/1971 | Ellefson | 59/7 |
| 3,709,423 | 1/1973 | Hano et al. | 228/6 X |
| 3,711,928 | 1/1973 | Boggs | 29/401 |
| 3,776,449 | 12/1973 | Jungle | 228/29 |
| 3,777,103 | 12/1973 | White et al. | 228/45 X |

FOREIGN PATENTS OR APPLICATIONS
1,027,582 4/1966 Great Britain................ 219/51

*Primary Examiner*—Charles W. Lanham
*Assistant Examiner*—D. C. Reiley, III
*Attorney, Agent, or Firm*—Phillips, Moore, Weissenberger, Lempio & Strabala

[57] ABSTRACT

A method and apparatus for rapidly and efficiently welding track hinge joints wherein the assembled track hinge joint is supported in a suitable fixture and welding guns are supported for movement in a circular path approximating the circumference of a track pin which is to be secured at its ends to respective track links. Additional means initially align the welding guns with the track pins, operation of the welding guns being regulated by suitable control means. The welding method and apparatus described above may also be employed for rebuilding endless track including a plurality of track hinge joints. Additional power units are employed to initially remove the track pin from the track hinge joint in order to prepare the track links for welding in subsequent reassembly as described above.

5 Claims, 5 Drawing Figures

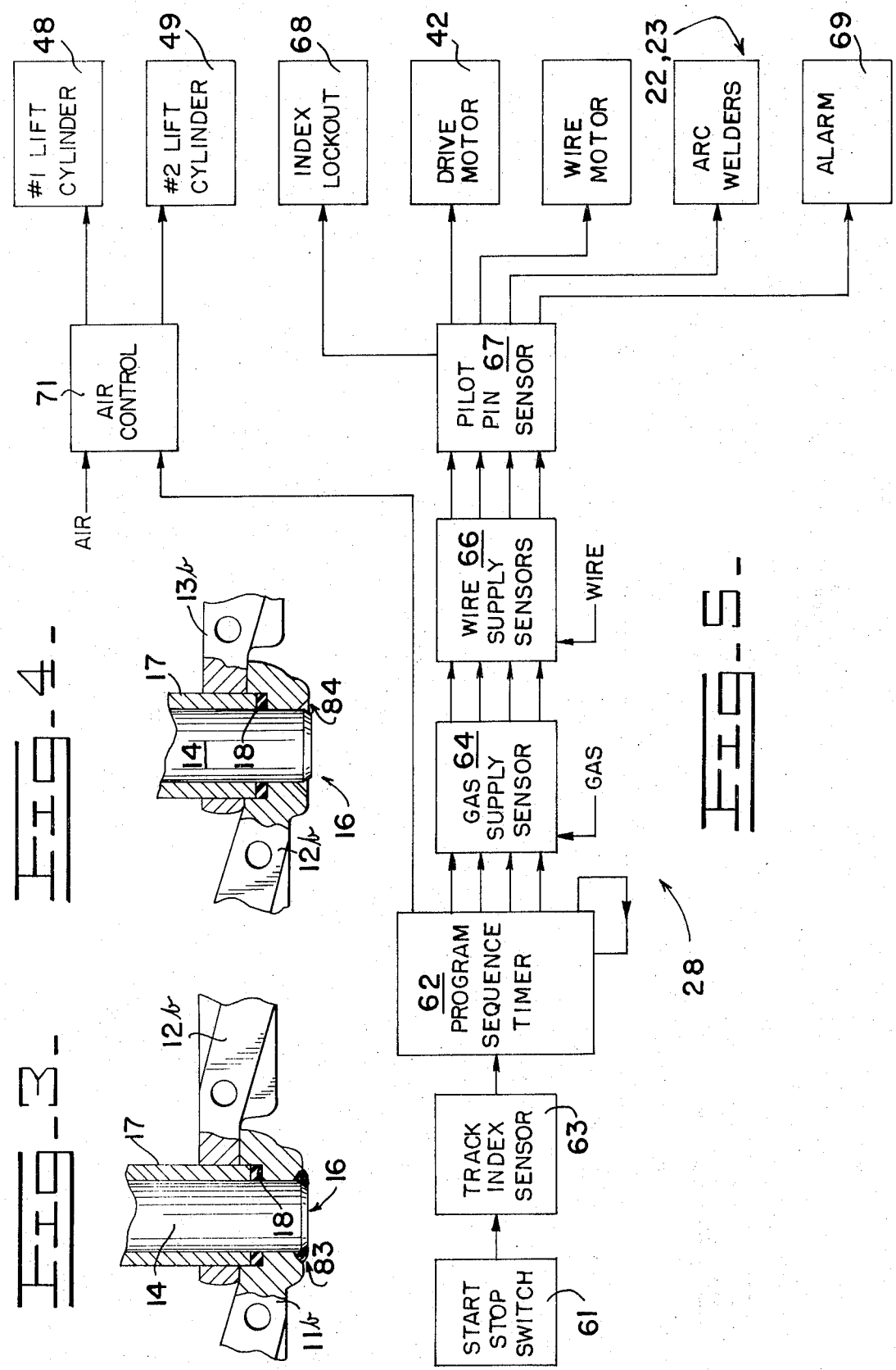

METHOD AND APPARATUS FOR ASSEMBLING WELDED TRACK HINGE JOINTS

BACKGROUND OF THE INVENTION

The present invention relates to a method and apparatus for assembling welded track hinge joints or for rebuilding and reassembling such welded track hinge joints. More particularly, the present invention relates to a method and apparatus wherein the opposite ends of a track pin are welded to respective track lines in an automatically controlled operation either to initially assemble endless track or to rebuild used track.

In conventional track of the type used, for example, in track laying vehicles, track hinges are pivotably secured together by track pins in successive track hinge joints. The construction of such endless track is made more apparent from the following description. However, it is noted that the track pins must be firmly secured to the track links in order to prevent failure within the track hinge joints. Normally, the track pin is rigidly secured to a pair of track links while additional track links are pivotably mounted upon the pin along with a rotatable bushing. The retention of the pin within the joint has become even more important where the track hinge joints are filled with lubricant and sealed. Within lubricated track hinge joints, relative axial movement of the pin may result in loss of the lubricant and early failure of the joint.

Welding is a very effective method for firmly securing the track pin to the one pair of track links but has previously been considered very time consuming and expensive for use in assembly of track link joints.

SUMMARY OF THE INVENTION

Accordingly, it is an object of the present invention to provide a particularly simple and effective method and apparatus for welding track hinge joints.

The method and apparatus for accomplishing such a weld basically comprises means for mounting welding guns for movement in circular paths approximating the circumference of the track pin in each joint. This permits the welding operation to be automated and further adapts the welding operation for coordination with normal assembly of the track hinge joints.

It is a further object of the present invention to provide a method and apparatus for removing the track pin from used track hinge joints in order to properly condition the track links for welding in a subsequent reassembly operation. The welding method and apparatus referred to above may then be employed in the reassembly of the track hinge joint.

Additional objects and advantages of the present invention are made apparent in the following description having reference to the accompanying drawings.

BRIEF DESCRIPTION OF THE DRAWINGS

FIGS. 3 and 4 are both fragmentary views of a track hinge joint illustrating a preferred method of removing weld material from track hinge joints prior to reassembly.

FIG. 5 is a schematic representation of an electrical control arrangement for regulating operation of the apparatus of FIG. 1.

DESCRIPTION OF A PREFERRED EMBODIMENT

The present invention relates to a method and apparatus for welding track hinge joints in endless track of the type used for example in track laying vehicles. Accordingly, the construction of such track hinge joints is described immediately below with particular reference to FIGS. 2–4 while various portions of the track hinge joints may also be observed in FIG. 1.

Figure 2:
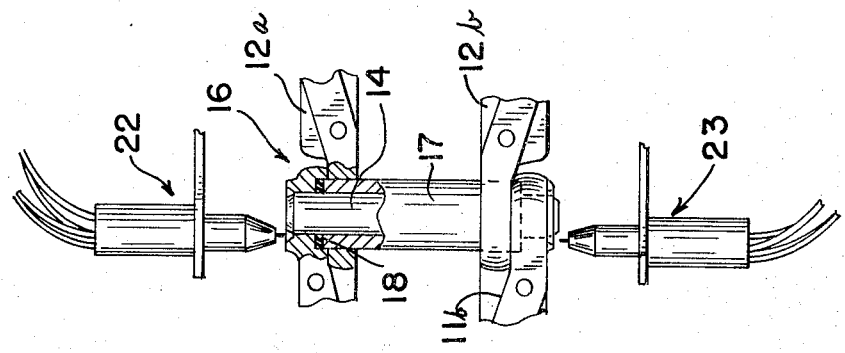
FIG. 2 is another fragmentary view illustrating how the apparatus and method of the present invention may be employed to rebuild and reassemble endless track.
Figure 2:
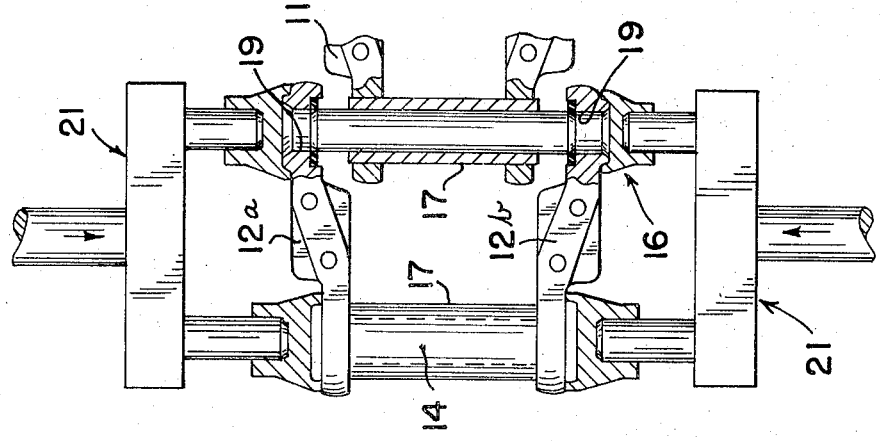
Figure 2:
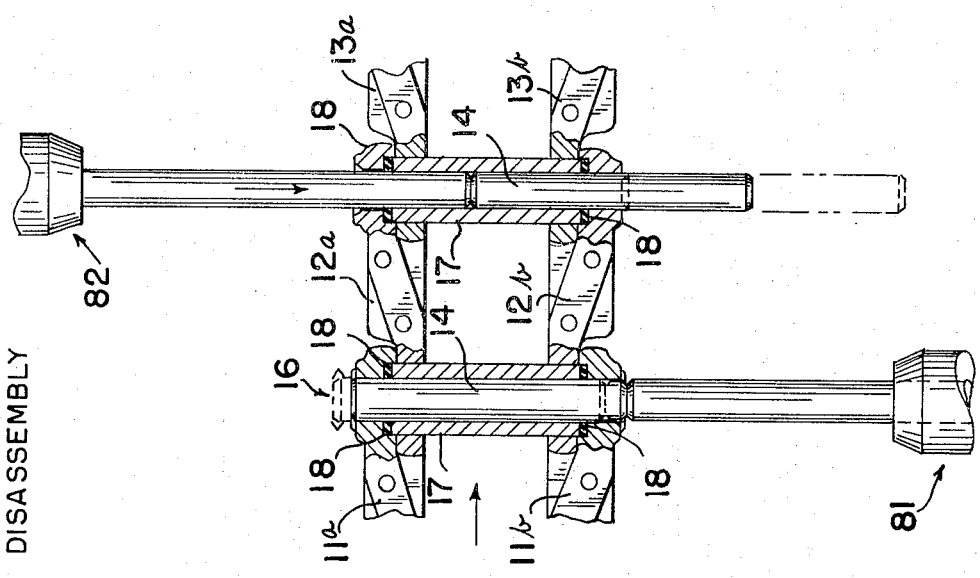

Endless track of the type contemplated by the present invention includes successive pairs of track links, for example as indicated at 11a, 11b, 12a, 12b and 13a, 13b in FIG. 2. Adjacent pairs of the track links are coupled together by track pins 14 to form track hinge joints as indicated at 16. The ends of the track links are arranged relative to each other to permit assembly in a continuous chain. As may be best seen on the left side of FIG. 2, each track link joint includes a track pin which is rigidly secured to the track links 11a and 11b. The track links 12a and 12b together with a central bushing 17 are rotatably supported upon the track pin 14. within track hinge joints used for example on track laying vehicles, it is common to provide a reservoir containing lubricant. The reservoir is not shown in the drawings but may be internally contained within each of the track pins 14. Such lubricant is intended to provide lubrication between the track pin and the bushing 17 particularly. To prevent the escape of lubricant, rotary seals 18 are arranged around each of the track pins 14 between the track links joined to each end of the track pin. For example, one of the rotary seal assemblies 18 is arranged between the adjacent ends of the track links 11a and 12a as well as between the adjacent track links 11b and 12b.

Figure 1:
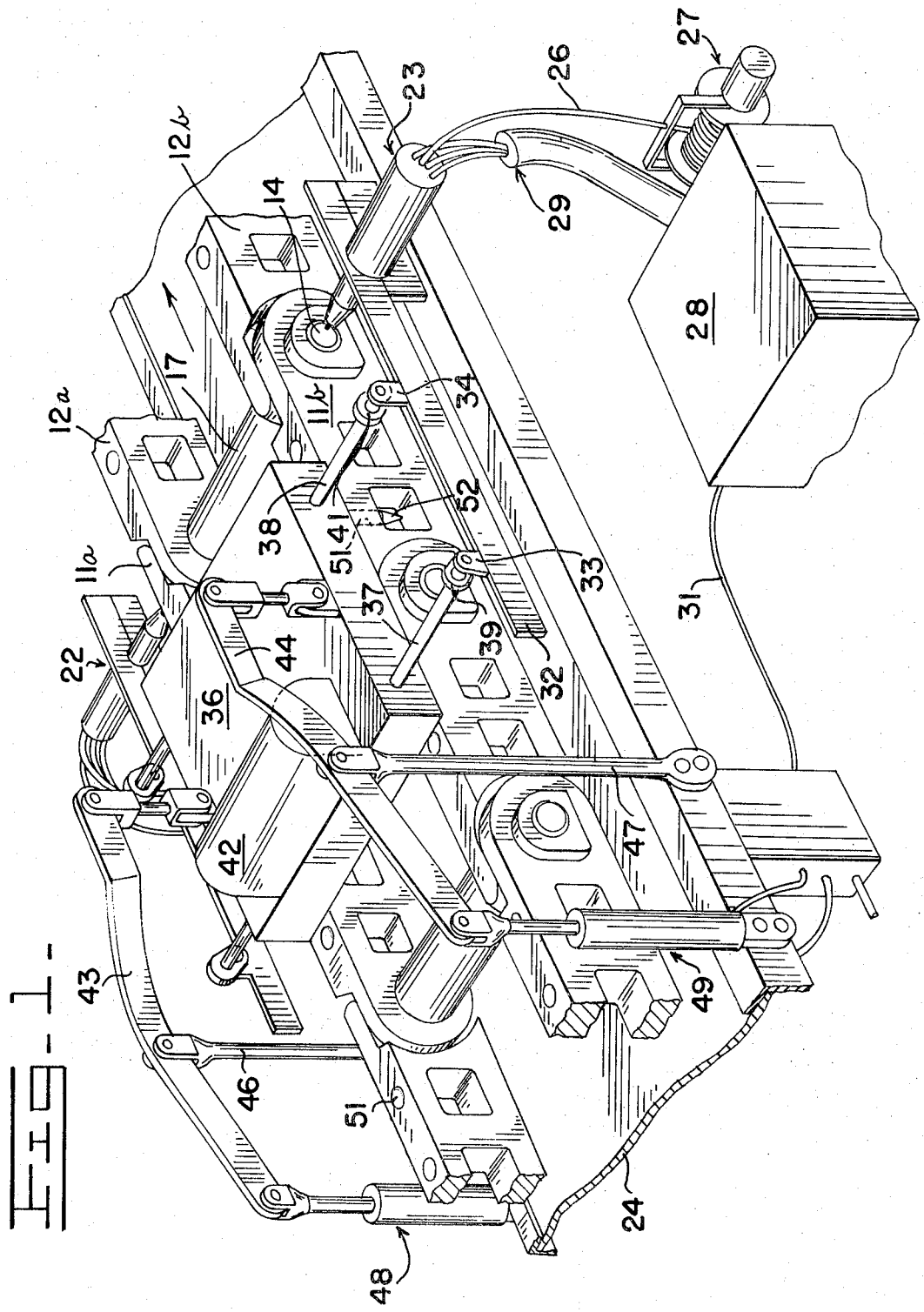
FIG. 1 is a fragmentary representation of an apparatus for welding track pins within track hinge joints according to the present invention.

Equipment for assembling such track hinge joints is also illustrated in FIGS. 1 and 2. Referring particularly to a central portion of FIG. 2, the various track components associated with a pair of track links, for example, those indicated at 12a and 12b, are assembled together. The bushings 17 and the inwardly angled ends of the track links tend to slide readily upon the track pins 14. The outwardly angled ends of the track links may have bores, as indicated, for example, at 19, which are sized for press-fit mounting upon opposite ends of the track pin 14. The press-fit relation between the track links and track pin may not be necessary in the present invention which contemplates welding together of those components. After the various track components are properly arranged, they are then pressed together by hydraulically actuated press assemblies as indicated at 21.

The present invention is particularly directed toward a method and apparatus for welding an outer end of each track pin 14 to one of the track links. As illustrated at the right of FIG. 2, each end of the track pin 14 is to be welded to one of the track links 11a and 11b. Fragmentary portions of welding guns 22 and 23 are indicated in FIG. 2. The apparatus for welding the track link joints is best illustrated in FIG. 1 wherein the endless track components are shown supported by a fixture 24 in the form of a table for supporting a number of the track links in succession. The fixture 24 is of the type conventionally employed to support the track components during assembly in the manner described above with reference to FIG. 2. The welding guns 22 and 23 are preferably of a type adapted for arc welding.

Referring particularly to the welding gun indicated at 23, welding wire denoted at 26 is supplied from a spool 27. A control panel for the welding gun 23 is indicated at 28. The control panel 28 is coupled with the welding gun 23 by a conduit assembly 29 which provides an electrical connection with the welding gun and supplies gas for shielding the weld zone during each welding operation. An additional electrical conduit 31 couples the control panel 28 with the fixture 24 for providing electrical continuity through the track components in order to establish a ground for the arc weld.

Each of the welding guns, for example that indicated at 23, is mounted upon an elongated element 32 having brackets 33 and 34. A central support platform 36 is arranged above the fixture 24 with rotatable rods 37 and 38 extending from the platform in opposite directions. Radially extending levers 39 and 41 are secured to the respective rods 37 and 38 while being pivotably coupled to the brackets 33 and 34. The lengths of the levers 39 and 41 are selected to approximate the radius for the track pins 14. Thus, as the rods 37 and 38 are driven in rotation by a motor indicated at 42, the welding guns 22 and 23 mounted upon the support elements 32 are driven in a circular path approximating the circumference of the track pin 14.

The platform 36 is pivotally supported from levers 43 and 44 which are pivotably mounted at midlength on brackets indicated at 46 and 47. The elongated brackets 46 and 47 may be supported for example upon the fixture 24. The levers 43 and 44 are regulated by pneumatic jacks indicated at 48 and 49. As illustrated in FIG. 1, the jacks 48 and 49 may be extended to lower the platform 36 toward the support fixture 24 or the jacks may be retracted to raise the platform.

Additional means are provided to assure that the welding guns are properly aligned with the exposed ends of the track pins 14. As may be best seen in FIG. 1, each of the track links 11, 12 and 13 includes holes 51 which are subsequently employed to mount additional track components. The alignment means contemplated by the present invention comprises a pin 52 arranged upon the platform 36 and directed downwardly for registry with one of the holes 51 when one of the track pins is in proper alignment with the welding guns 22 and 23 as illustrated in FIG. 1. Accordingly, when the track components are properly positioned upon the fixture 24, the platform 36 is lowered by the levers 43 and 44 so that the pin 52 registers with and enters the hole 51. One of the track link joints 16 may then be completed by actuation of the welding guns 22, 23 and rotary movement of the support elements 32. The track components may then be moved upon the fixture to align a new track hinge joint 16 with the welding guns. In this manner, the welding operation may take place simultaneously with the assembly of a different track hinge joint possibly upon the same fixture 24.

The control panel 28 is illustrated schematically in somewhat greater detail in FIG. 5. Referring to that figure, the control panel is adapted to a sequentially operate the pneumatic cylinder 48, 49, the drive motor 42 and the arc welding guns 22 and 23. The control panel 28 includes a start/stop switch 61 which permits manual control or provides an override function. The actual operating sequence as determined by a timer 62 may also be initiated by a track index sensor 63 of a conventional design for electrically sensing the position of a track hinge joint 16 in alignment with the welding guns 22 and 23 as indicated in FIG. 1. Upon actuation, the timer 62 causes a gas supply sensor 64 and a wire supply sensor 66 to provide gas and wire to the arc welding guns 22 and 23. These functions as well as the electrical actuation of the arc welding guns 22 and 23 may also be overridden by a conventional sensor means 67 for assuring proper registry of the alignment pins 52 in the track link holes 51 (see FIG. 1). An index lockout 68 may also be used in conjunction with the pin sensor 67 to prevent operation if the pins 52 are not in proper registry with the track links. An alarm 69 may also be actuated to indicate such a condition of non-alignment. The pneumatic cylinders 48 and 49 are also actuated by an air control valve 71 which functions in response to the timer 62 for communicating air under pressure to actuate the cylinders 48 and 49.

In operation of the welding apparatus, the platform 36 is raised by retraction of the jacks 48 and 49 while the track components are positioned upon the fixture 24. With the track components properly in position, the jacks 48 and 49 are extended to lower the platform 36 so that the welding guns 22 and 23 are placed in alignment with the opposite ends of one of the track pins 14. With the welding guns 22 and 23 being made operable, the drive motor 42 rotates the rods 37 and 38 so that the welding guns 22 and 23 are moved gradually about the periphery of the track pin 14. Operation of the motor 42 is coordinated so that the welding guns move in approximately a 360° circle to completely weld the track pins 14 to the track links. After the weld is complete, the welding guns are deactuated and the jacks 48 and 49 are retracted to permit repositioning of the track components upon the fixture 24 for a new weld operation.

The present invention further contemplates the above welding apparatus and method for use in reassembling or rebuilding used track. In that instance, it is first necessary to break apart the pins 14 from the links to which they are welded and also to condition those components for rewelding if they are to be used again. In many applications, the same track pins are reused along with the track links after rebuilding of the track hinge joints. It has been discovered that a V-shaped groove may be formed at the end of each track pin 14 and adjacent track hinge suitable for receiving a new weld fillet without further conditioning. This technique, which is also a portion of the present invention is described in greater detail below.

In an assembled track hinge joint where the track pin 14 is secured to the track links by welding, an annular ring of weld material is formed about each end of the pin 14. This material may be removed from both the track link and the pin by movement of the pin in opposite axial directions relative to the links. In this manner, both the links and the pins can also be conditioned for rewelding after reassembly of the track hinge joints without further conditioning being necessary.

Referring particularly to the left end of FIG. 2, hydraulic jacks partially illustrated at 81 and 82 may be used to break the weld material away from the track pins 14 and the links, for example, those indicated at 11a and 11b. In a typical operation, the hydraulic jack 81 may be first extended to drive the pin 14 in one axial direction, for example, in an upward direction as viewed in FIG. 2. The other hydraulic jack 82 may be subsequently actuated after appropriate movement of the track components to shift the track pin 14 in the opposite direction. The manner in which weld material is removed from each end of the track pin 14 and the adjacent track links is better illustrated in FIGS. 3 and 4.

Referring now to FIG. 3, as the pin 14 is driven in an upwardly direction, the pin 14 tends to be broken loose from the weld material which is indicated generally at 83. At the other end of the pin 14, the weld material is simultaneously breaking loose from the adjacent track link (for example, the track link 11a in FIG. 2). Referring now to FIG. 4, as the pin 14 is driven in the opposite direction by the jack 82, the weld material 83 tends to be broken away from the adjacent track link, such as that indicated at 12b in FIG. 4. Simultaneously, weld material is also broken away from the opposite ends of the pin 14 as is apparent by reference to FIG. 2. As is shown in FIG. 4, a chamfer is thus formed in both ends of the track pin as well as the adjacent track links to form a V-shaped groove 84 which is ideally suited for rewelding of those components in subsequent assembly of the track hinge joint. This cleaning operation may be combined with conventional assembly and the welding technique described above as is compositely illustrated in FIG. 2 for rebuilding used track.

In the claims:

1. Welding apparatus for bonding track hinge joints wherein opposite ends of a track pin extend through bores in track links to which the pin is to be bonded, comprising
   fixture means for supporting the track pin assembled in the bores of the track links,
   weld guns arranged on opposite sides of the fixture in facing relation with a respective end of the assembled track pin,
   support means mounting the weld guns for movement in a circular path approximating the circumference of the track pin,
   motor means effectively coupled between the fixture means and the support means to move the weld guns in the circular path,
   means for aligning the support means with the assembled track hinge joint, and
   control means for regulating operation of the weld guns and the motor means.

2. The welding apparatus of claim 1 wherein the support means is arranged adjacent the fixture means, the aligning means comprising a pin mounted on the support means for registry with a selected opening in one of the track links.

3. The welding apparatus of claim 2 wherein the support means is arranged above the fixture means, lift means being operable to raise and lower the support means between bonding operations for successive track hinge joints.

4. The welding apparatus of claim 1 adapted for reconditioning of assembled track hinge joints and comprising drive means arranged on opposite sides of the fixture in axial alignment with the track pin of an assembled track hinge joint, the drive means being operable to urge the track pin first in one axial direction and then in the other axial direction to remove weld material from both the track links and the track pin prior to reassembly and rewelding of the track hinge joints.

5. In a method of disassembling and rebuilding track hinge joints of the type wherein opposite ends of a track pin extend through bores in track links with annularly shaped weld material bonding each end of the track pin in place within the bore of one of the track links, the steps comprising
   supporting the track hinge joint in a suitable fixture,
   axially driving the track pin through the bore of each track link away from the weld material to form an annular chamfer on each end of the track pin,
   axially driving a cylindrical element through the bore of each track link toward the weld material to form an annular chamfer at one end of the bore of each track link,
   reassembling elements to form the track hinge joint, and
   forming an annular weld between each end of a track pin and a track link through which the track pin extends.

* * * * *